United States Patent

Ponzo

[11] Patent Number: 4,654,997
[45] Date of Patent: Apr. 7, 1987

[54] CRAB TRAP

[76] Inventor: Charles Ponzo, 37 Abby La., Shirley, N.Y. 11967

[21] Appl. No.: 890,339

[22] Filed: Jul. 29, 1986

[51] Int. Cl.⁴ ............................................. A01K 69/10
[52] U.S. Cl. ......................................... 43/102; 43/105
[58] Field of Search ................................... 43/102, 105

[56] References Cited

U.S. PATENT DOCUMENTS

| | | | |
|---|---|---|---|
| 1,531,300 | 3/1925 | Merle | 43/105 |
| 1,968,758 | 7/1934 | Gatch | 43/105 |
| 2,603,030 | 7/1952 | Pape | 43/105 |
| 3,678,612 | 7/1972 | Hendrickson | 43/105 |
| 3,867,782 | 2/1975 | Ortiz | 43/105 |
| 4,044,493 | 8/1977 | Fox | 43/105 |

*Primary Examiner*—Gene P. Crosby
*Attorney, Agent, or Firm*—Michael I. Kroll

[57] ABSTRACT

A crab trap is provided and consists of four grid covered panels hinged together forming a parallelepiped collapsible frame, two grid covered doors which are bottom hinged to the frame and two narrow grid covered locking flaps which are hinged to top panel between the side panels of the frame for stabilizing the frame when the frame is open.

1 Claim, 6 Drawing Figures

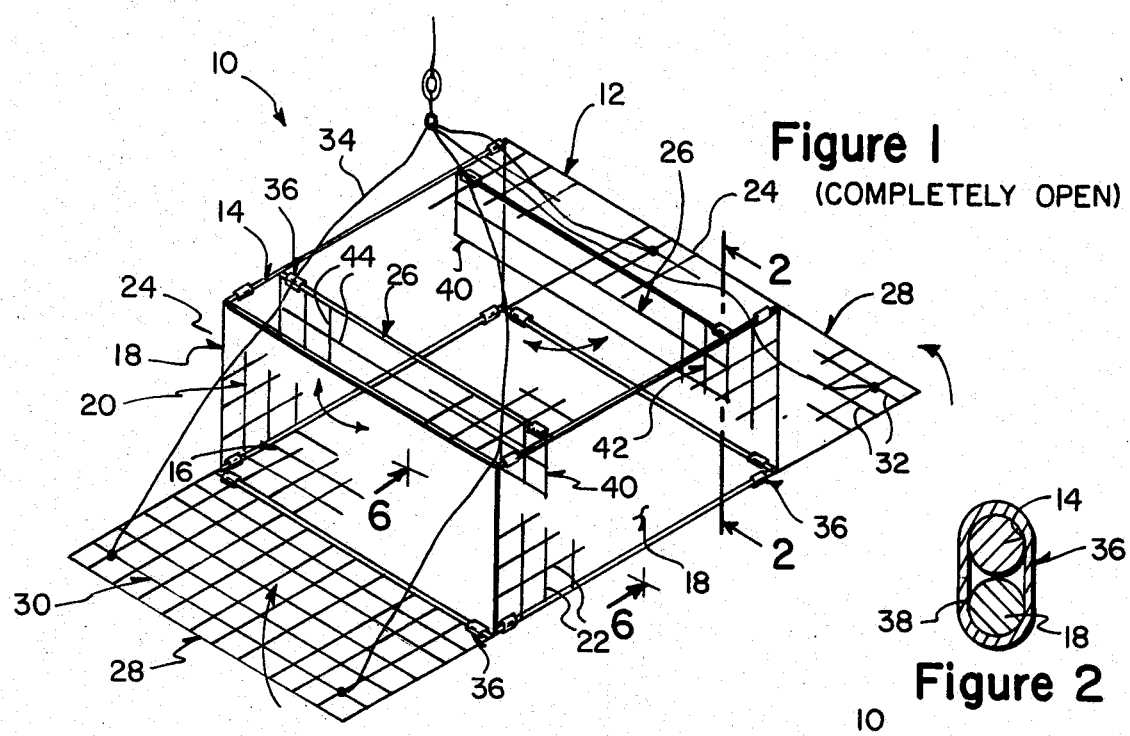
Figure 1 (COMPLETELY OPEN)
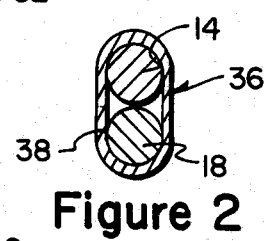
Figure 2
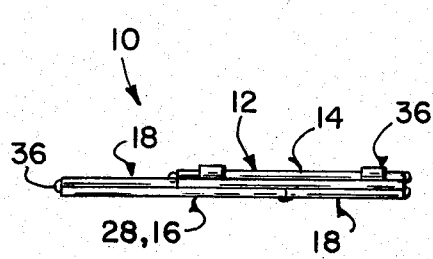
Figure 3 (CLOSED)
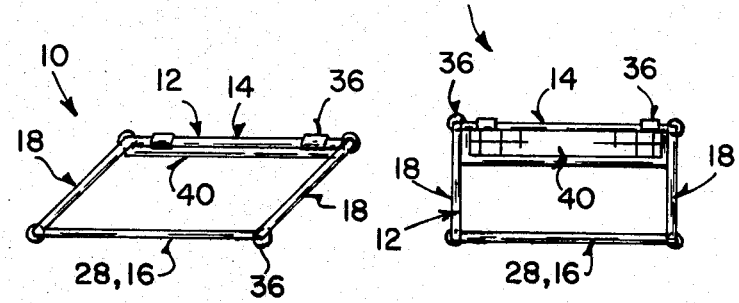
Figure 4 (PARTLY OPEN)
Figure 5 (OPEN)
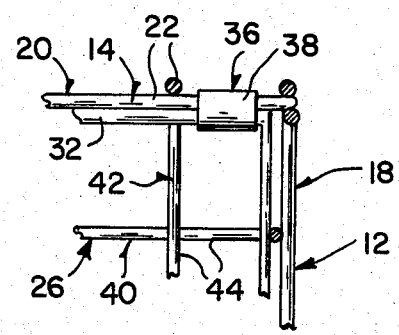
Figure 6

CRAB TRAP

BACKGROUND OF THE INVENTION

1. Field of the Invention

The instant invention relates generally to fishing equipment and more specifically it relates to a crab trap.

2. Description of the Prior Art

Numerous fishing equipment have been provided in prior art that are traps to capture crabs and the like. They tend to take up a great deal of storage space when being transported. While these units may be suitable for the particular purpose to which they address, they would not be as suitable for the purposes of the present invention as heretofore described.

SUMMARY OF THE INVENTION

A primary object of the present invention is to provide a crab trap that will overcome the shortcomings of the prior art devices.

Another object is to provide a crab trap that will quickly collapse for storage and can be transported without taking up too much space.

An additional object is to provide a crab trap that includes a two door single unit construction that is self erecting when hoist lines are lifted up, making trap ready for use.

A further object is to provide a crab trap that is simple and easy to use.

A still further object is to provide a crab trap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention.

FIG. 2 is a detailed cross sectional view taken along line 2—2 in FIG. 1 showing one of the hinges.

FIG. 3 is a front view thereof showing the trap fully collapsed.

FIG. 4 is a front view thereof showing the trap partially open.

FIG. 5 is a front view thereof showing the trap fully open.

FIG. 6 is a detailed cross sectional view taken along line 6—6 in FIG. 1 showing a portion of one of the locking flaps.

DETAILED DESCRIPTION OF THE PREFERRED EMBODIMENTS

Turning now descriptively to the drawings, in which similar reference characters denote similar elements throughout the several views, FIGS. 1 through 6 illustrates a crab trap 10 that consists of a parallelepiped frame 12 covered on top 14, bottom 16 and two side 18 with a grid 20 of intersecting bars 22. The frame 12 has open ends 24 whereby crabs (not shown) may enter either of the ends 24 but are prevented from exiting the top 14, the bottom 16 and the sides 18 due to the grid 20.

A structure 26 as described later, is built into the frame 12 for stabilizing the frame. Two doors 28 covered with a grid 30 of intersecting bars 32 are hinged to the bottom 16 of the frame 12 at the open ends 24 thereof. A hoist line 34 is connected to the doors 28 so that when the doors are pulled up by the hoist line 34 the crabs inside of the frame 12 will become trapped therein.

The frame 12 further contains two equal dimensioned panels which form the sides 18 and two equal dimensioned panels which form the top 14 and the bottom 16. The two side panels 18 and the top and bottom panels 14 and 16 are connected by hinges 36 in at least two places along four places of intersection of the panels. Each of the hinges 36 includes an elliptically shaped band 38 which encircles the adjacent panels in order to permit free hinging of the panels.

The stabilizing structure 26 consists of two narrow locking flaps 40. Each of the locking flaps 40 are covered with a grid 42 of intersecting bars 44. The locking flaps 40 are spaced apart and suspended from the bars 22 of the top panel 14 by the hinges 36 in at least two places to extend between the side panels 18 to stabilize the frame 12. When the frame 12 is to be collapsed the locking flaps 40 can manually pivot upwards against the top panel 14. This allows the top and the bottom panels 14 and 16 to move parallel to each other to collapse the frame 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A crab trap, comprising:
    (a) a parallelepiped frame covered on top, bottom and two sides with grid intersecting bars in which two equal dimensioned panels form said top and said bottom and two equal dimensioned panels form said sides, said two side panels and said top and said bottom panels are connected by a first set of hinges in at least two places along four places of intersection of said panels, said first set of hinges including an elliptically shaped band which encircles said adjacent panels in order to permit free hinging of said panels, said frame having open ends whereby crabs may enter either of said ends but are prevented from exiting said top, said bottom and said sides due to said grid;
    (b) means for stabilizing said frame, said stabilizing means including two narrow locking flaps, wherein each of said locking flaps are covered with a grid of intersecting bars, said locking flaps spaced apart and suspended from said bars of said top panel by a second set of hinges in at least two places to extend between said side panels to stabilize said frame and when said frame is to be collapsed said locking flaps can manually pivot upwards against said top panel so that said top and said bottom panels are allowed to move parallel to each other to collapse said frame;
    (c) two doors each covered with additional grid intersecting bars, each of said doors hinges to said bottom of said frame at said open ends thereof; and
    (d) a hoist line connected to said doors so that when said doors are pulled up by said hoist line, said crabs inside of said frame become trapped therein.

* * * * *